(12) United States Patent
De Miranda Cará et al.

(10) Patent No.: US 10,239,633 B2
(45) Date of Patent: Mar. 26, 2019

(54) SYSTEM AND METHOD TO INTERCHANGE FLIGHT CONTROL INCEPTORS IN AN AIRCRAFT FLIGHT CONTROL SYSTEM AND COCKPIT

(71) Applicant: Embraer S.A., São José dos Campos (BR)

(72) Inventors: Guilherme De Miranda Cará, São José dos Campos (BR); Nilson Emanuel Bezerra Chaves, São José dos Campos (BR); Celso Jose Amaral Fonseca, São José dos Campos (BR); Marcos Vinicius Campos, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 0 days.

(21) Appl. No.: 14/950,542

(22) Filed: Nov. 24, 2015

(65) Prior Publication Data
US 2016/0229521 A1    Aug. 11, 2016

Related U.S. Application Data

(60) Provisional application No. 62/085,006, filed on Nov. 26, 2014.

(51) Int. Cl.
*B64D 43/00* (2006.01)
*B64C 13/06* (2006.01)
(Continued)

(52) U.S. Cl.
CPC .............. *B64D 43/00* (2013.01); *B64C 13/04* (2013.01); *B64C 13/06* (2013.01); *B64C 27/56* (2013.01); *B64D 11/0689* (2013.01); *Y02T 50/44* (2013.01)

(58) Field of Classification Search
None
See application file for complete search history.

(56) References Cited

U.S. PATENT DOCUMENTS 2,385,184 A * 9/1945 Barber .................... B64C 13/02
244/234
2,697,566 A * 12/1954 Glass ...................... B64C 13/00
244/222
(Continued)

FOREIGN PATENT DOCUMENTS

EP    2 261 116 A2    12/2010
GB     1140266 A      1/1969
(Continued)

OTHER PUBLICATIONS

International Search Report dated Feb. 17, 2016, issued in related International Application No. PCT/BR2015/000178.
(Continued)

*Primary Examiner* — Redhwan K Mawari
*Assistant Examiner* — Edward Torchinsky
(74) *Attorney, Agent, or Firm* — Nixon & Vanderhye P.C.

(57) ABSTRACT

A flexible flight control system enables conversion from one architecture using one type of inceptor to another architecture using another type of inceptor, through the usage of modular software and hardware pieces with common interfaces among the different types of inceptors. Longitudinal and lateral directional control laws are adapted to be compatible with the specific aspects of the operation of each configuration/architecture, giving the option to the aircraft operator to choose any one of a number of inceptor architectures at time of manufacture.

19 Claims, 8 Drawing Sheets

(51) Int. Cl.
  *B64C 13/04* (2006.01)
  *B64C 27/56* (2006.01)
  *B64D 11/06* (2006.01)

(56) References Cited

U.S. PATENT DOCUMENTS

| | | | | |
|---|---|---|---|---|
| 5,470,232 | A * | 11/1995 | Kelso | G09B 9/28 |
| | | | | 434/45 |
| 6,241,182 | B1 | 6/2001 | Durandeau et al. | |
| 7,551,989 | B2 | 6/2009 | Knotts et al. | |
| 7,579,966 | B2 | 8/2009 | Priest | |
| 7,725,613 | B2 * | 5/2010 | Bhardwaj | G06F 9/4413 |
| | | | | 710/10 |
| 8,606,437 | B2 * | 12/2013 | Caldeira | G05D 1/0676 |
| | | | | 244/178 |
| 2004/0029094 | A1 * | 2/2004 | McGraw | G09B 9/00 |
| | | | | 434/365 |
| 2007/0077540 | A1 * | 4/2007 | Testrake | G09B 9/08 |
| | | | | 434/37 |
| 2008/0234881 | A1 | 9/2008 | Cherepinsky et al. | |
| 2008/0272243 | A1 * | 11/2008 | Decker | B64C 13/04 |
| | | | | 244/221 |
| 2010/0266991 | A1 * | 10/2010 | Gregoire | G09B 9/301 |
| | | | | 434/38 |
| 2014/0131523 | A1 * | 5/2014 | Carner | B64C 13/04 |
| | | | | 244/235 |
| 2016/0229521 | A1 * | 8/2016 | De Miranda Car | B64C 13/04 |

FOREIGN PATENT DOCUMENTS

| | | | | |
|---|---|---|---|---|
| WO | WO9503212 | * | 2/1995 | B64C 13/12 |
| WO | 2014/075023 A1 | | 5/2014 | |

OTHER PUBLICATIONS

Mcmahon, Ryan P., "From In-Flight Simulators to UAV Surrogates," 2013, 12 pages.
Mcmahon, Ryan, "From In-Flight Simulators to UAV Surrogates," Calspan Corporation, Oct. 29, 2013, 33 pages.
Weingarten, Norman C., "History of In-Flight Simulation & Flying Qualities Research at Calspan," AIAA Journal of Aircraft, vol. 42, No. 2, Mar./Apr. 2005, 15 pages.

* cited by examiner

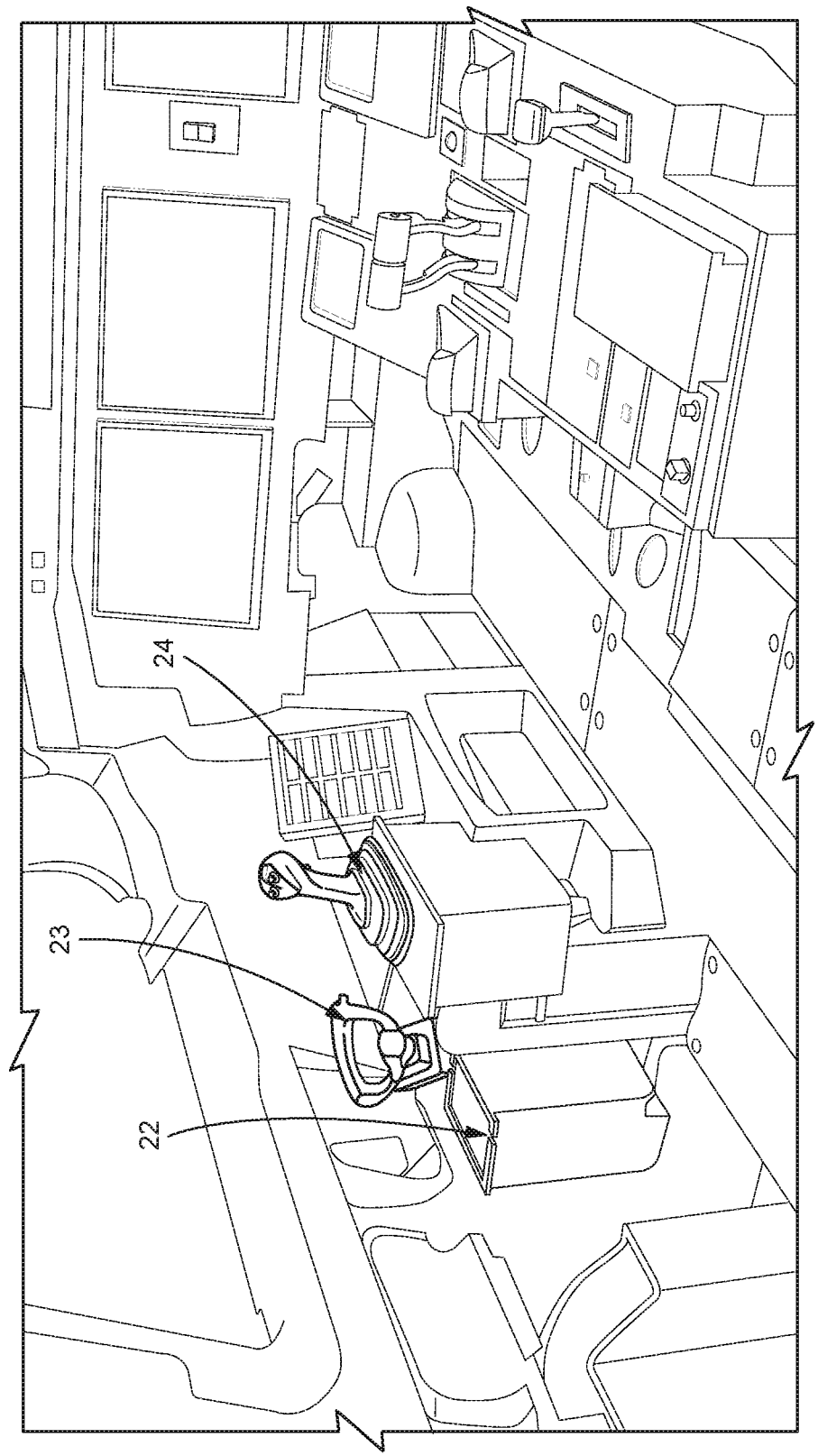

SYSTEM AND METHOD TO INTERCHANGE FLIGHT CONTROL INCEPTORS IN AN AIRCRAFT FLIGHT CONTROL SYSTEM AND COCKPIT

CROSS-REFERENCE TO RELATED APPLICATIONS

This application claims the benefit of U.S. Provisional Patent Application No. 62/085,006 filed Nov. 26, 2014, incorporated herein by reference.

STATEMENT REGARDING FEDERALLY SPONSORED RESEARCH OR DEVELOPMENT

None.

FIELD

The technology herein relates to avionic flight controls and to aircraft flight control systems. In more detail, the technology herein relates to and provides systems, mechanisms and methods to be used in a flight vehicle that allows a. reconfiguration among different types of flight control inceptors or other input controls.

BACKGROUND AND SUMMARY

Non-limiting technology herein provides a flexible flight control system that enables conversion from one architecture (using one type of inceptor) to another architecture (using another, different type of inceptor), through the usage of modular software, firmware and/or hardware pieces with common interfaces among the different types of inceptors. Longitudinal, lateral and other directional control laws are adapted in order to be compatible with specific aspects of the operation of each configuration (architecture), giving the option to the aircraft operator to choose any one of a number of inceptor architectures at time of manufacture. An existing fleet can be retrofitted to change from one type of control inceptor architecture to another through dedicated maintenance tasks. The example non-limiting technology herein thus allows the conversion among different types of inceptors.

Example non-limiting features and/or advantages include:
  A flight control system and a method that provide conversion capability among any type of flight control inceptor. Some examples of possible inceptors (non-limiting) are wheel-and-column, side-stick (passive or active) and center-stick.
  A way for the flight control system to be switched from one type of flight control inceptor to another. Some common non-limiting means are straps, jumpers, configuration pins or software with different identification and part number.
  A longitudinal control law that can be reconfigured for a specific type of inceptor. An example would be a configuration that provides neutral speed stability when using side-sticks and positive speed stability when using column or yoke.
  A lateral-directional control law whose roll demand can be adapted to any type of flight control inceptor.
  Depending on the application, for better ergonomics, the pilot and co-pilot seats can be also reconfigured, mainly with respect to the arm rest which should be enlarged for side-sticks when compared to column, as an example.

BRIEF DESCRIPTION OF THE DRAWINGS

The following detailed description of exemplary non-limiting illustrative embodiments is to be read in conjunction with the drawings of which:
FIGS. 5A, 5B shows example details of how an illustrative cockpit could be converted from a traditional yoke configuration to a side-stick.

DETAILED DESCRIPTION

Typically in the aeronautical industry, a given aircraft type is conceived, developed and certified with a predefined flight control system architecture. Each architecture considers a specific flight control inceptor. Some typical inceptors used in the aeronautical industry are wheel-and-column, passive or active side-sticks, and center-sticks.

Generally, primary cockpit flight controls include a control yoke (also known as a control column), or a center stick or side-stick (the latter two also colloquially known as a control or joystick). Such flight controls are manipulated by the pilot to control the aircraft's roll and pitch. In older aircraft, a direct mechanical linkage such as a cable or a hydraulic linkage between the yoke or stick and the aircraft control surfaces moved the ailerons when the turned or deflected left and right, and moved the elevators when moved backwards or forwards. In most modern commercial aircraft, "fly by wire" systems use digital signal linkages to couple such input inceptors to remote actuators via a processor that in turn changes the positions of the ailerons or other control surfaces.

Inceptors vary among different aircraft. There are yokes where roll is controlled by rotating the yoke clockwise/counterclockwise (like steering a car) and pitch is controlled by tilting the control column towards you or away from you. In other aircraft, pitch is controlled by sliding the yoke into and out of the instrument panel. In some aircraft, the roll is controlled by sliding the whole yoke to the left and right. Center sticks also vary between aircraft.

Figure 1A:
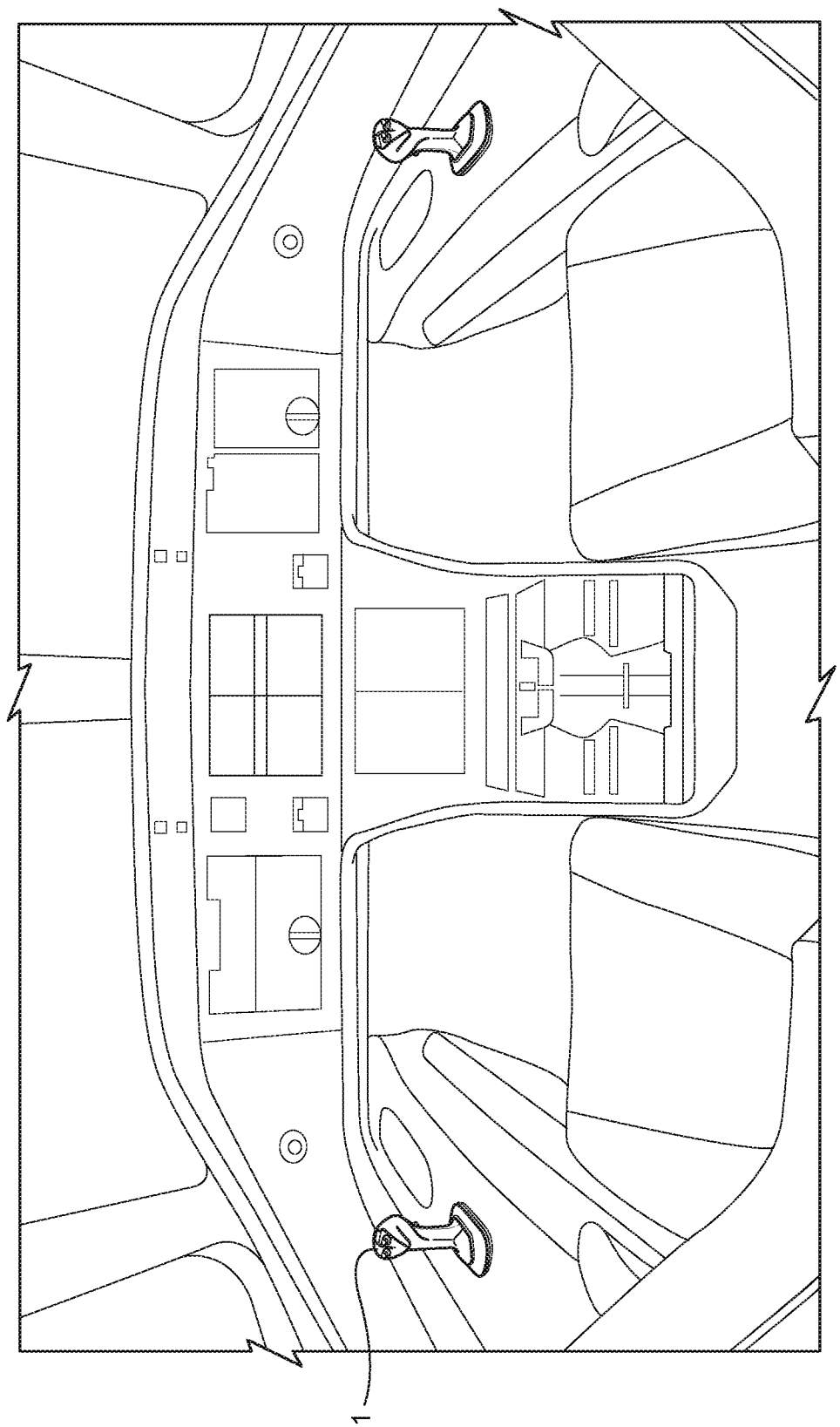
FIG. 1A shows one example application of a side-stick inceptor based flight control system.
Figure 1B:
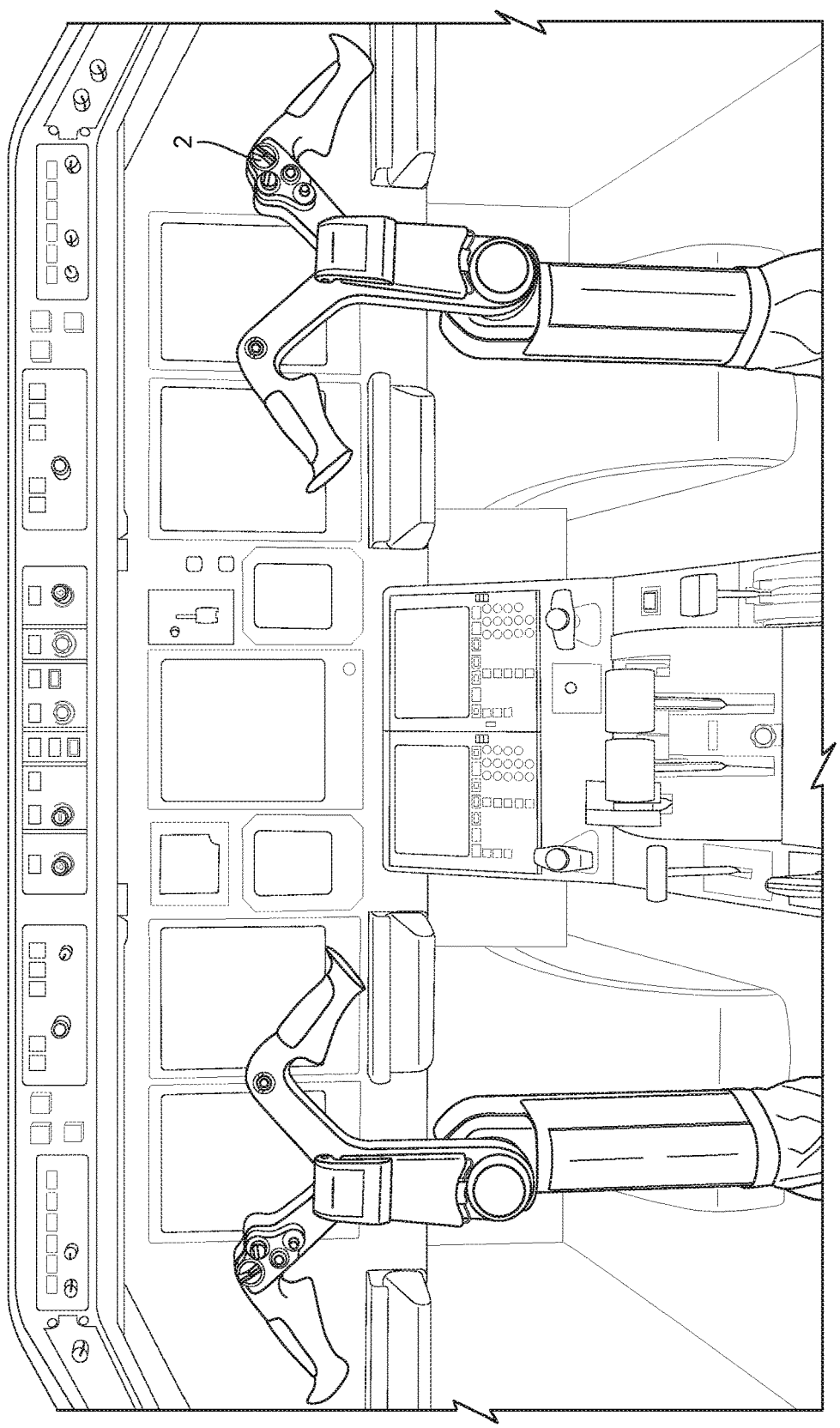
FIG. 1B shows an example application of a yoke-and-column inceptor based flight control system.

FIGS. 1A, 1B show the two most common examples (but not limited to) of possible inceptors, that can be chosen: (1) side-stick or (2) wheel-and-column. Currently, the aviation industry is bipolarized with respect to the usage of wheel-and-column (FIG. 1B) and side-stick (FIG. 1A). Roughly half of the market in commercial aviation has adopted the side-stick configuration as shown in FIG. 1A. The remaining portion has chosen the wheel-and-column flight controls system as shown in FIG. 1B. Some specific applications, mainly in the military aviation, use a center-stick as the flight controls inceptor. In civil aviation, the side-sticks presented some benefits, such as reduction in weight and crew workload. However, supporters of wheel-and-column claim situational awareness and more adequate sensitiveness with consequent enhancement of safety as the main advantages of this type of inceptor. The broadly usage of both technologies indicates that there is no unanimity about the advantages of one solution over the other.

Some advantages of the side-stick inceptor architecture are:
  Weight reduction;
  Improved ergonomics;
  Workload reduction;
  In conjunction with envelope protection control laws, provides safety enhancement.

Some advantages of the column, in turn, are:
  Situational awareness benefits from visual and tactile cues
  Improved sensitiveness (with higher forces, column is less prone to over-control);
  Easier adaptation from light aviation;
  Reduced development costs and certification risk.

Center-sticks are used to provide more precise handling in specific military missions, being more common in fighters and trainers.

Although scenarios described above show clear segmentation of the market between different inceptor approaches, a given aircraft type is typically designed with a particular pre-defined inceptor solution.

One example non-limiting embodiment provides a flight control system that can be reconfigured to different types of inceptors. Some examples include, but are not limited to, wheel-and-column, side-sticks and center-sticks.

In terms of example non-limiting hardware interfaces, solutions are designed to keep a high degree of commonality for electrical power and sensors, allowing easy installation and conversion among different chosen types.

From the software perspective, in the longitudinal axis, control laws are designed for compatibility with all pre-defined inceptors and the system is adaptable to the different control inceptor inputs. A typical example would be a gamma-dot (γ)control law providing auto-trim and flight-path stability compatible with side-stick operation and γ–U providing manual trim and speed-stability for column or yoke operation.

In one example non-limiting embodiment, with the side-sticks, the longitudinal control law controls a. gamma dot variation. With the side-stick(s) in the neutral position, the aircraft would keep a given flight path angle, consequently being flight path stable. The control law would provide auto-trim capability, not being necessary to activate a pitch trim switch or apply force in the side-stick during flight for speed variation.

On the other hand, with the wheel-and-column, the longitudinal control law is converted to provide speed stability. In this sense, speed variation is achieved through the usage of the column or pitch trim switch commands. After removal of force in the column, the control law recovers an original reference speed. Application of pitch trim switch command in turn, changes a speed-reference, trying to mimic operation of a conventional aircraft with the advantages of closed loop control, i.e., less sensitiveness of weight and center of gravity variation, better predictably of aircraft response and rejection of external disturbances such as gust and turbulence.

In the lateral axis, operation of a P-Beta control law in one example embodiment is conceptually the same for all types of lateral inceptors with the lateral command being converted to a roll demand in and pedal position providing a beta (side-slip angle) command. However, the roll demand from wheel, to side-stick, center-sticks, or others, can be adapted to provide suitable handling quality and adequate forces.

As an example, the switching from control laws for compatibility among the types of inceptors, can be done based on straps, jumpers or configuration pins in the main control law computer associated with the given aircraft type.

Physically, the conversion from one type of inceptor to the other can be implied in the repositioning of cockpit parts, besides the installation and removal of the inceptor itself. The pilot and co-pilot seats can be adapted as well for improved ergonomics.

Figure 2:
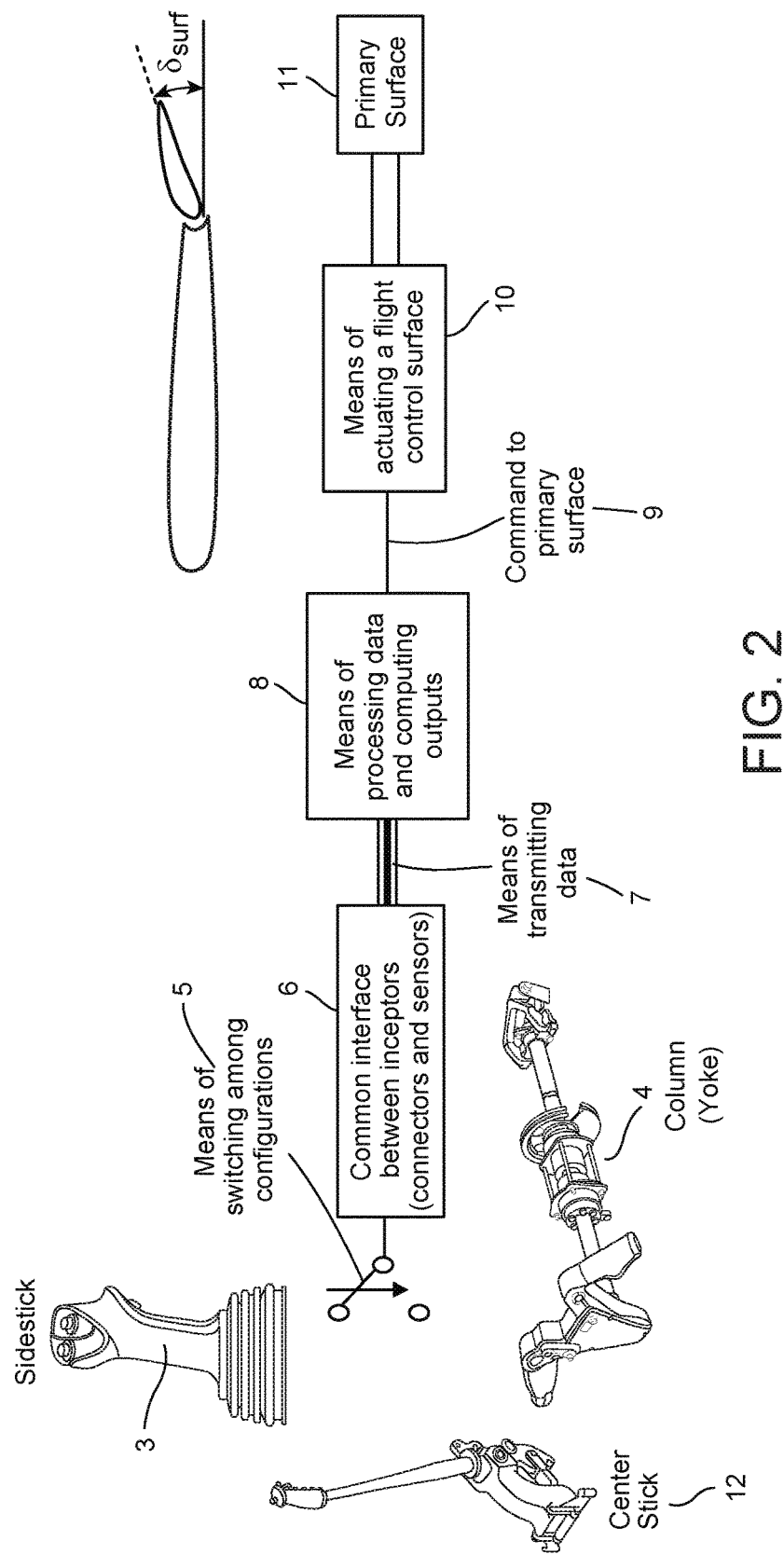
FIG. 2 shows a schematic of an example flight control system with reconfiguration possibility for different flight control inceptors.

A preferred embodiment is shown in FIG. 2. In this example, a flight vehicle such as an airplane is equipped with a side-stick (3), a yoke (4), a center-stick (12), a column (yoke) 4, or any other inceptor a human pilot can manipulate to control flight. A suitable means (5) of switching among types of inceptors is provided. This means for switching (5) can be software, firmware, hardware or a combination, for reconfiguration. For example, the switching means 5 can comprise a digital or analog multiplexer, a software controlled processor, an application specific integrated circuit, an electromechanical switch such as a DIP switch, a relay, a touch screen, or other example implementation. The switching means (5) in one example can be a control input that specifies the type of inceptor. In another implementation, the switching means (5) can comprise a device that selectively connects one inceptor or another to the system. Specific examples include straps, jumpers, configuration pins or software or firmware with different identification and/or part numbers and/or versions.

In the example shown, a common interface (6) is provided between the various inceptor configurations. Such an interface (6) can comprise connectors, electrical power connections and/or position sensors. Such an interface (6) can be provided in order to allow a reduction in the effort of the reconfiguration. The interface (6) can thus include intelligence that automatically detects which type of inceptor is currently connected. In order to be interchangeable, the different inceptors in one example implementation will have and use a common connector. In order words, the flight controls computer will keep the current interface as a plan, and the second inceptor will be redesigned to keep the current connector interface.

In the example shown, conventional means of transmitting data (7) such as analog wiring and/or digital buses are used to feed a main flight controls computer (8) with the inceptor positions. The flight controls computer can comprise a digital or analog computer such as a microprocessor or microcomputer coupled to a computer storage medium such as a digital memory device, random access memory and/or read only memory, in one example embodiment, computer 8 executes firmware (software) instructions stored in the computer storage medium (e.g., a flash or other semiconductor memory device) to implement a control law that processes the inceptor input(s) and provides an output. By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1200. For purposes the claims, the phrase "computer storage medium" and variations thereof, does not include waves, signals, and/or other transitory and/or intangible communication media, per se.

Summed up to other sensor information such as airspeed, altitude, aircraft acceleration and attitude, the control law outputs are calculated and the control surface commands are generated (9) by the means of actuating a flight control surface. The actuating means 9 can comprise an electrical actuator, a hydraulic actuator or other mechanical, fluid or electromechanical (including electromagnetic) devices that in response to an input is able to generate force that changes the position of a control surface by a controlled amount to thereby control the position of the control surface. Means of providing power or control current to control surface actuators (hydraulic, or a power transistor, for instance) (10) is used to move the control surface(s) (11) such as ailerons, flaps, etc.

Figure 3:
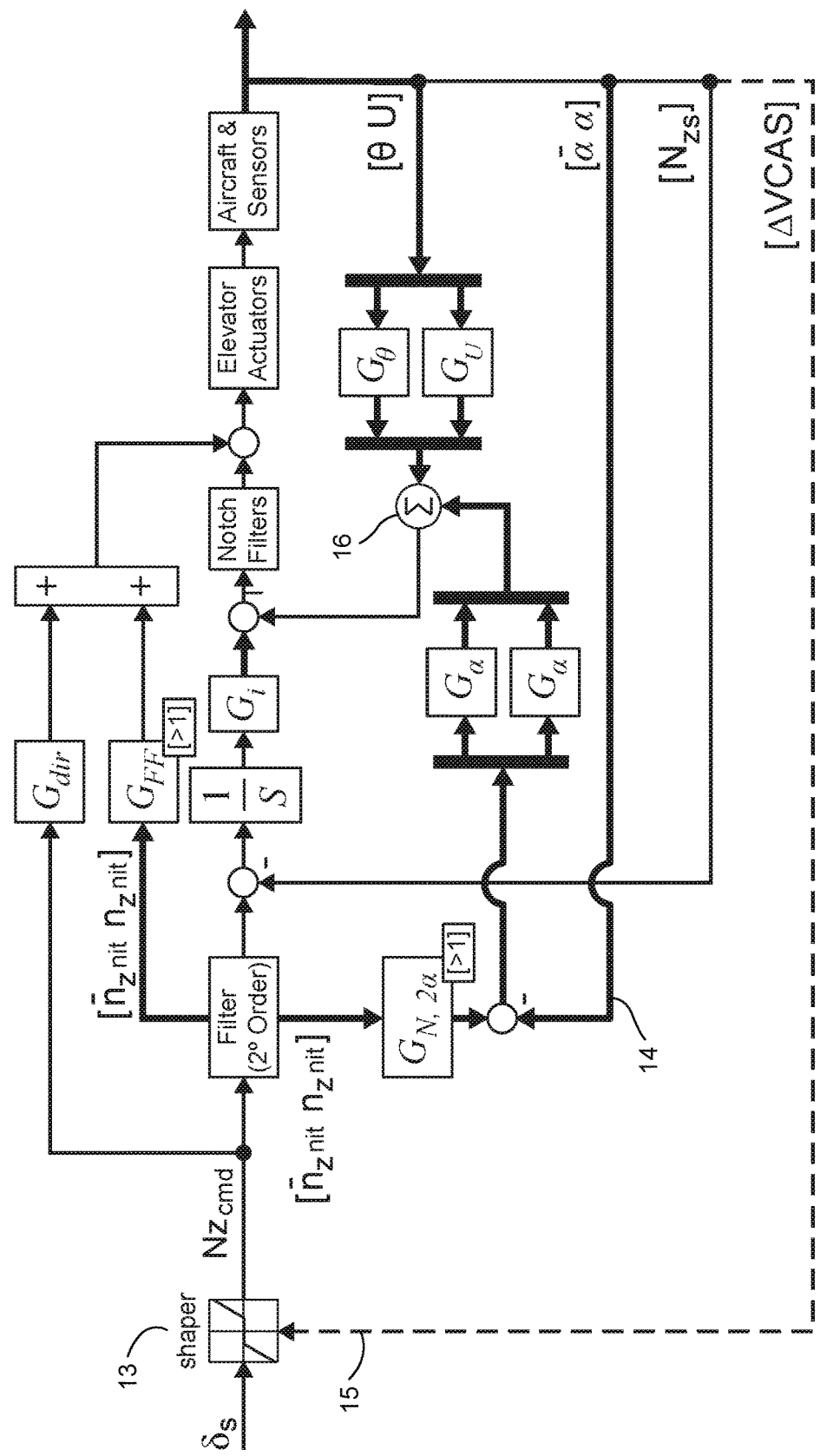
FIG. 3 shows a diagram of an example longitudinal control law with the possibility of adding a speed-stability path.

FIG. 3 describes an example non-limiting longitudinal control law that supports any type of inceptor, for instance, side-sticks or wheel-and-column. This control law can be implemented by the means of processing data and computing outputs (8). FIG. 3 shows that a shaper 13 is used to selectively shape the inceptor input to provide an Nzemd signal. This NZemd signal is applied to a Gdir computation block and to a filter that can have any order such as 0, 1, 2, etc. The output of the filter is applied to a summer that receives the output Nzs generated at the right-hand side. The output of the summer is inverted by an inverter and applied to a Gi block. The output of the Gi block is summed by a further summing node before being applied to notch filters. The notch filter output is applied to a further summing node that receives a selected one of either Gdir and/or Gff (generated by the filter). The output generated by this node can be used to control the elevator actuators. Meanwhile, the control of the elevators causes changes in the flight state of the aircraft which is sensed by conventional sensors. These sensors sense flight condition of the aircraft including attitude, angle of attack, etc. The sensor outputs are further processed by the GΘ, GU processing blocks the outputs of which can be summed by the summer 16 with Gα outputs. A Gn,2α block also computes an output for comparison to the α inputs from the sensors.

As can be seen, the control law of FIG. 3 is reconfigurable depending on the particular inceptor being used. For example, when using side-sticks, the longitudinal inceptor displacement is converted to a load factor demand or flight path variation for a given airspeed (13). Through the feedback of angle-of-attack and the rate of angle of attack states (14), summed to feed-forward command based on side-stick position, accuracy of load factor control is achieved. This configuration provides neutral speed stability and auto-trim. If sidestick is kept in a neutral position, the aircraft maintains trajectory, being consequently classified as flight path stable.

When reconfigured to wheel-and-column, as an example, the closed loop is performed over speed rather than load factor. In this sense, airspeed is fed-back as an outer loop (15). In order to improve speed control, aircraft longitudinal attitude and true airspeed are fed-back as well (16). This configuration provides positive speed stability and therefore, speed is changed if force is applied over the yoke. If the inceptor returns to neutral, airspeed returns to reference speed.

Figure 4B:
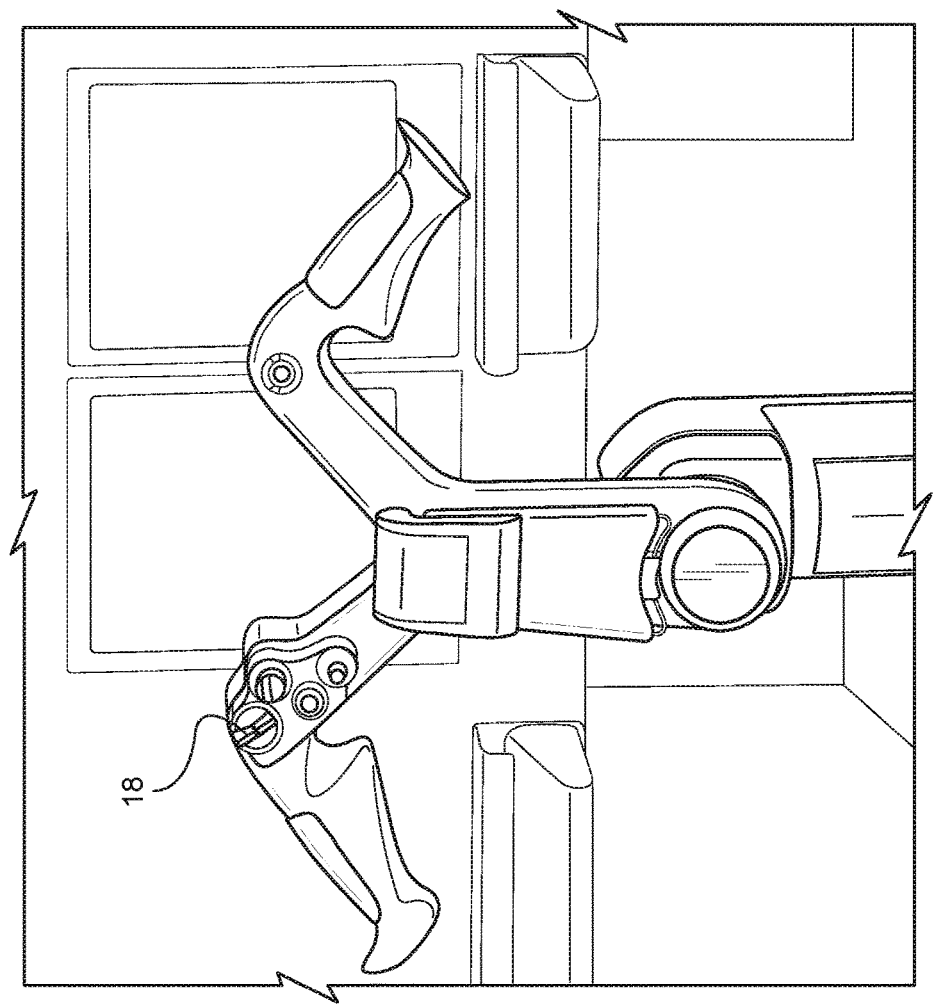
FIG. 4B shows an example traditional pitch trim switch in a yoke.
Figure 4A:
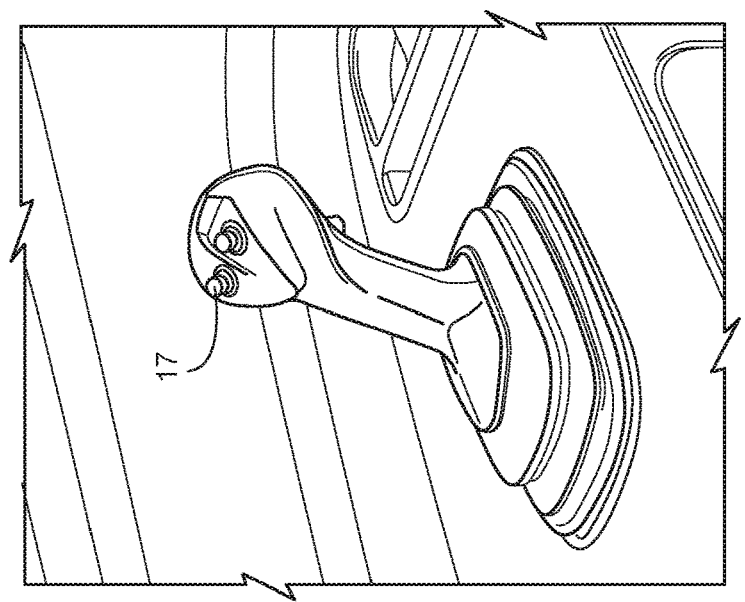
FIG. 4A shows an example trim control system ("TCS") trim switch of a side-stick.

FIGS. 4A, 4B provide two examples for providing speed reference. With side-stick configuration (FIG. 4A), a momentary switch (17) can provide a reference speed. When using column or yoke (FIG. 4B), the speed reference is provided to a traditional pitch trim switch (18) command.

In the lateral-directional axis, the structure of the control law need not be changed. However, the roll demand can be adapted from side-stick to wheels, for example, to provide adequate forces and handling qualities.

Figure 5A:
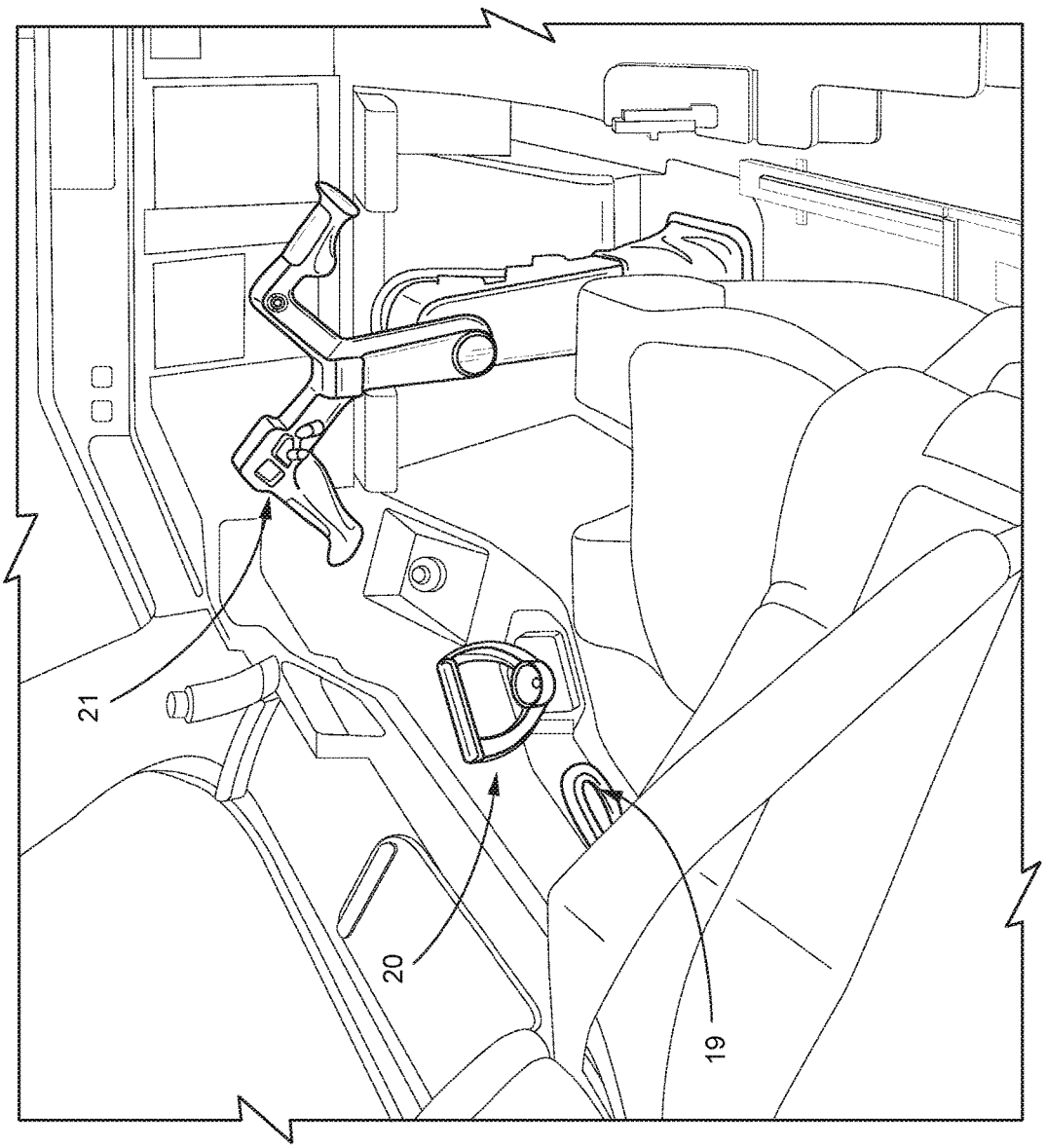

FIG. 5A, 5B shows details of an illustrative example of how a cockpit could be adapted from the traditional wheel-and-column configuration to a side-stick. In this specific case, the oxygen mask (19) and the steering handle (20) can be repositioned. The column mechanism (21) can be completely removed and the floor was recovered. After repositioning of oxygen mask (22) and steering handle (23), side-stick is installed (retrofitted) as a replaceable unit (24). See FIG. 5B.

Figure 6B:
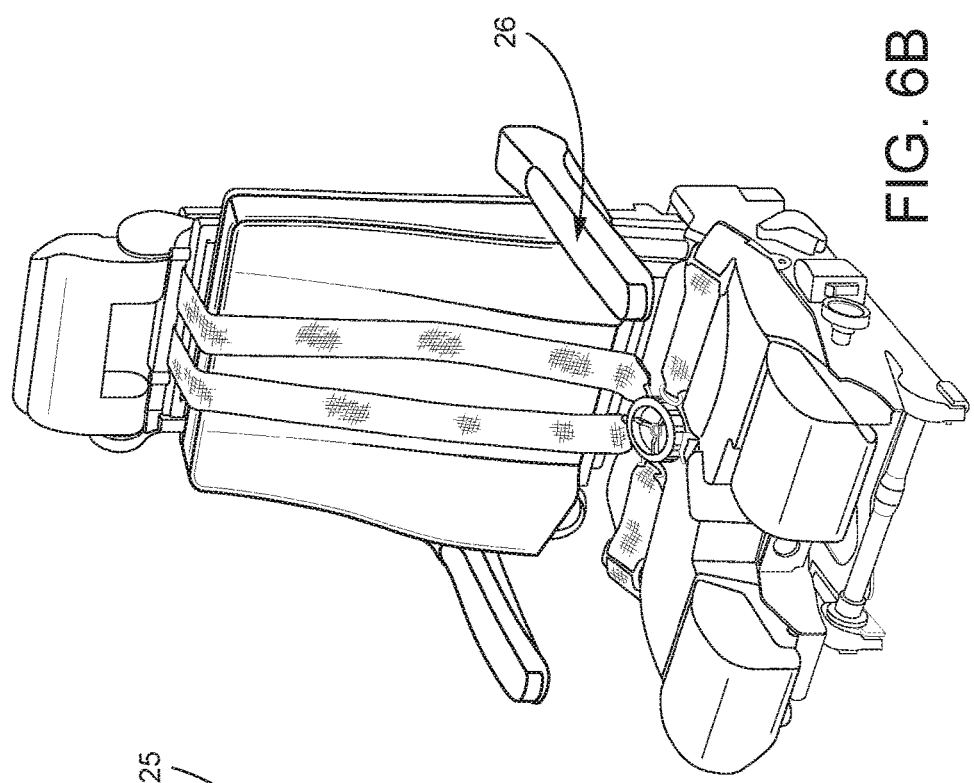
FIGS. 6A, 6B show how pilot and co-pilot seats can be adapted depending on the inceptor configuration.
Figure 6A:
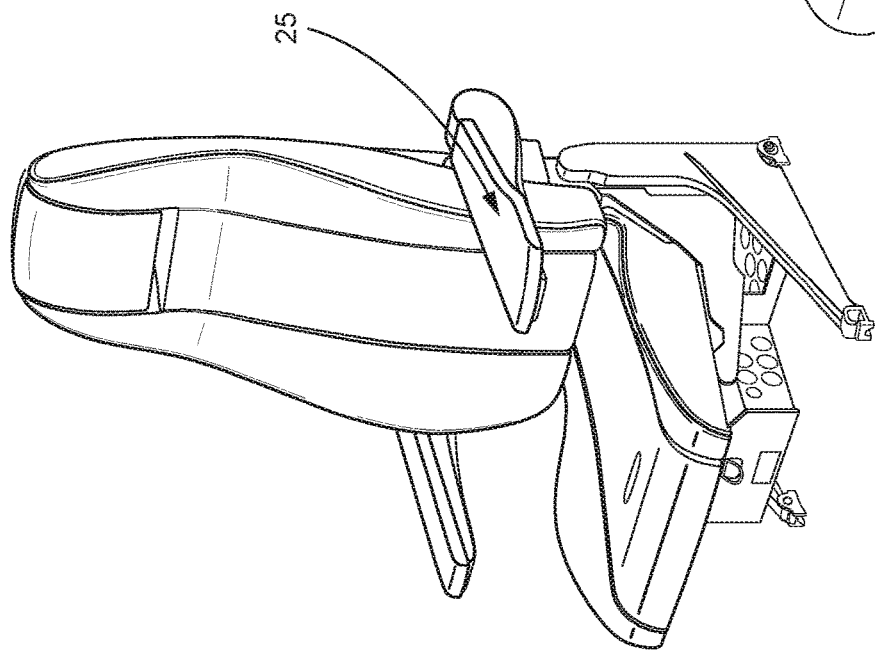

FIGS. 6A, 6B show that in order to provide adequate ergonomics for both usages, pilot and co-pilot seats can also be redesigned. As shown in FIG. 6B as compared to Figure. 6A, the armrest can be enlarged (25) in order to provide suitable support for side-stick usage when compared to the shorter armrest for wheel-and-column operation (26).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A reconfigurable flight control system comprising:
an interface alternatively connectable to a first inceptor or to a second inceptor different from the first inceptor;
at least one processor coupled to the interface, the processor executing program instructions to determine which of the first inceptor and the second inceptor is connected to the interface, the at least one processor implementing one of a first control law function and a second control law function to process inceptor inputs provided to the interface, the at least one processor selecting between implementing the first control law function and implementing the second control law function to process said inceptor inputs depending on which of the first inceptor and the second inceptor is connected to the interface; and
at least one actuator controllable by the processor, the at least one processor controlling, based on the implemented control law function processing the inceptor inputs, the actuator to control at least one control surface to control flight; and
wherein the first inceptor comprises a yoke, the second inceptor comprises a side stick and the control law adapts by alternatively performing over speed and load factor depending on which inceptor is connected to the interface.

2. The flight control system of claim 1 wherein the processor provides conversion capability for different types of flight control inceptor including wheel-and-column, passive side-stick, active side-stick and center-stick.

3. The system of claim 1 further including a switch that switches from one type of flight control inceptor to another, the switch comprising a strap, jumper, configuration pin or software with different identification and/or part numbers.

4. The system of claim 1 wherein the processor implements a longitudinal control law that adapts to a specific type of inceptor.

5. The system of claim 4 wherein the adaptation comprises using a neutral speed stability when using side-sticks and using positive speed stability when using column or yoke.

6. The system of claim 1 wherein the processor implements a lateral-directional control law whose roll demand is adapted to different types of flight control inceptors.

7. The system of claim 1 further including pilot and co-pilot seats are reconfigured with respect to armrests which are enlarged for a side-stick inceptor when compared to a column inceptor.

8. The system of claim 1 wherein the processor selectively activates a feedback path depending on whether the first inceptor or the second inceptor is connected to the interface.

9. The system of claim 1 wherein angle of attack feedback is selectively used depending on whether the first inceptor or the second inceptor is connected to the interface.

10. The system of claim 1 wherein the processor selects different reference speeds depending on whether the first inceptor or the second inceptor is connected to the interface.

11. A retrofit kit for a flight control system configured to use a control law to process inputs from a first inceptor, the kit comprising:
a replacement inceptor for connection to flight control system interface instead of the first inceptor;
firmware comprising control law instructions for storing into a memory device coupled to at least one processor, the processor being coupled to the interface, the processor executing the control law instructions to implement a modification of said control law that adapts the system to the replacement inceptor; and
a seat modification,
wherein the first inceptor comprises a yoke, the replacement inceptor comprises a side stick and the control law instructions adapt to the replacement inceptor instead of the first inceptor by alternatively performing over speed and load factor depending on which inceptor is connected to the interface.

12. The kit of claim 11 wherein the modification comprises selectively activating a feedback path.

13. The kit of claim 11 wherein the modification comprises selecting whether or not to use angle of attack feedback.

14. The kit of claim 11 wherein the modification comprises selecting a different reference speed.

15. The kit of claim 11 wherein the modification comprises using neutral speed stability instead of positive speed stability.

16. The kit of claim 11 wherein the modification comprises using positive speed stability instead of neutral speed stability.

17. The kit of claim 11 wherein the modification comprises adapting the roll demand of a lateral-directional control law.

18. The kit of claim 11 wherein the seat modification comprises structure that reconfigures seats with respect to armrests.

19. A reconfigurable flight control system comprising:
an interface alternatively connectable to a first inceptor or to a second inceptor different from the first inceptor;
at least one processor coupled to the interface, the processor executing program instructions to determine which of the first inceptor and the second inceptor is connected to the interface, the at least one processor implementing a control law to process inceptor inputs provided to the interface, the at least one processor adapting the control law depending on which of the first inceptor and the second inceptor is determined to be connected to the interface; and
at least one actuator controllable by the processor, the at least one processor controlling, based on the adapted control law processing the inceptor inputs, the actuator to control an elevator
wherein the first inceptor comprises a yoke, the second inceptor comprises a side stick and the control law adapts by alternatively performing over speed and load factor depending on whether the first inceptor or the second inceptor is connected to the interface.

* * * * *